United States Patent

[11] 3,582,242

| | | |
|---|---|---|
| [72] | Inventor | Lowell D. Hansen<br>Hudson, Ohio |
| [21] | Appl. No. | 822,874 |
| [22] | Filed | May 8, 1969 |
| [45] | Patented | June 1, 1971 |
| [73] | Assignee | Borg-Warner Corporation<br>Chicago, Ill. |

[54] PRESSURE LOADED PUMP
5 Claims, 4 Drawing Figs.

[52] U.S. Cl. .................................................. 418/132
[51] Int. Cl. ....................................................... F01c 19/08,
F04c 15/00, F04c 27/00
[50] Field of Search ........................................... 103/126 L,
126 LB; 230/141; 91/80, 87; 123/12 D; 103/111
C5; 418/132

[56] References Cited
UNITED STATES PATENTS

| | | | |
|---|---|---|---|
| 2,932,254 | 4/1960 | Booth et al. .................. | 103/126L |
| 3,083,645 | 4/1963 | Donner et al. ................ | 103/126LB |
| 3,473,476 | 10/1969 | Davidson..................... | 103/126L |

*Primary Examiner*—Carlton R. Croyle
*Assistant Examiner*—John J. Vrablik
*Attorneys*—Donald W. Banner, Lyle S. Motley, C. G. Stallings and William S. McCurry ABSTRACT: A pressure loaded gear pump having axially movable pressure loadable bushings. The movable bushings are urged axially toward the pumping gears to establish a sealing relation between gear side faces and bushing sealing faces to provide efficient pump operation. The axially movable bushings include outer peripheral surfaces including helically formed serrations or grooves. These grooves insure freedom of mobility of the bushings.

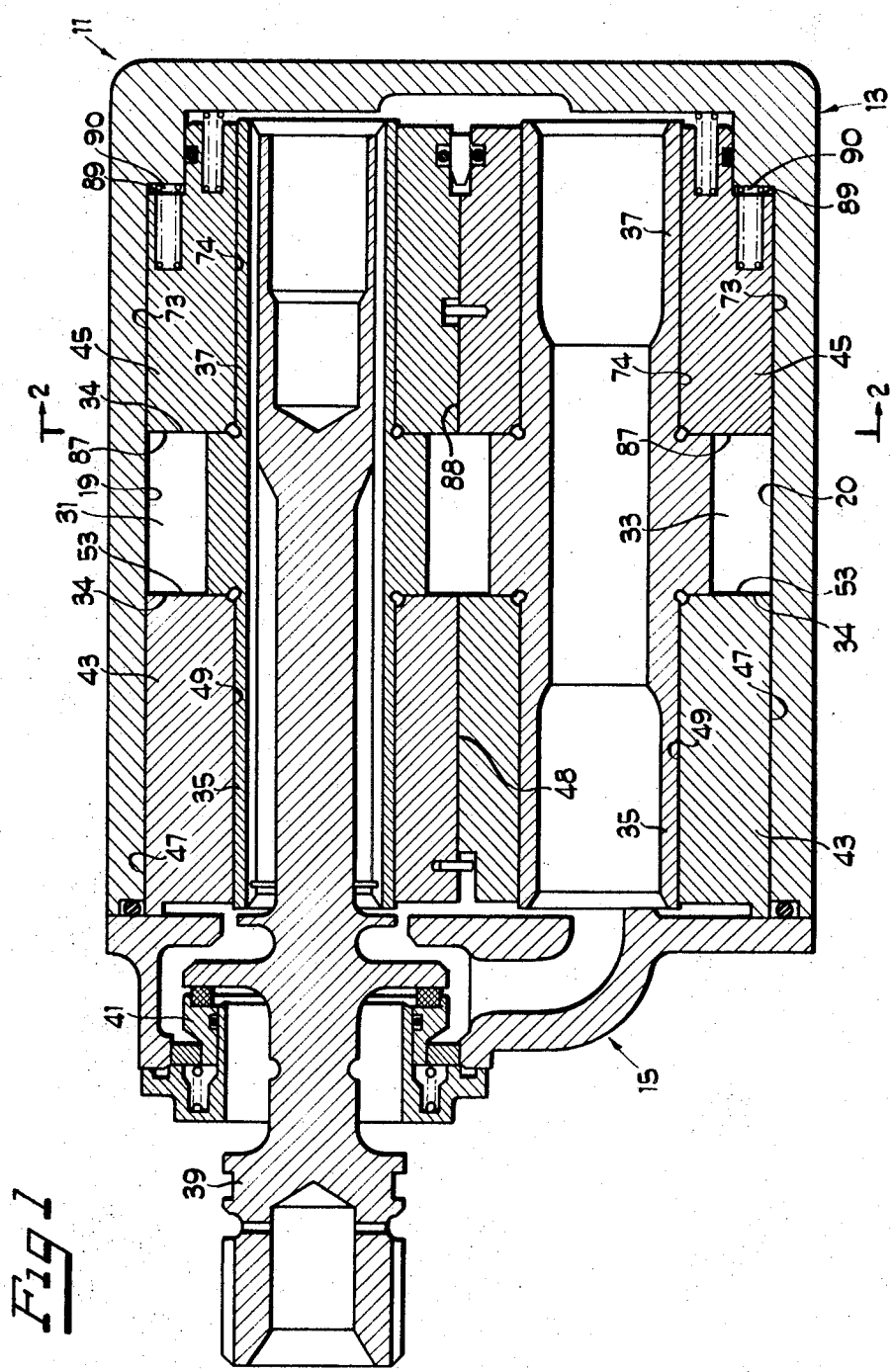

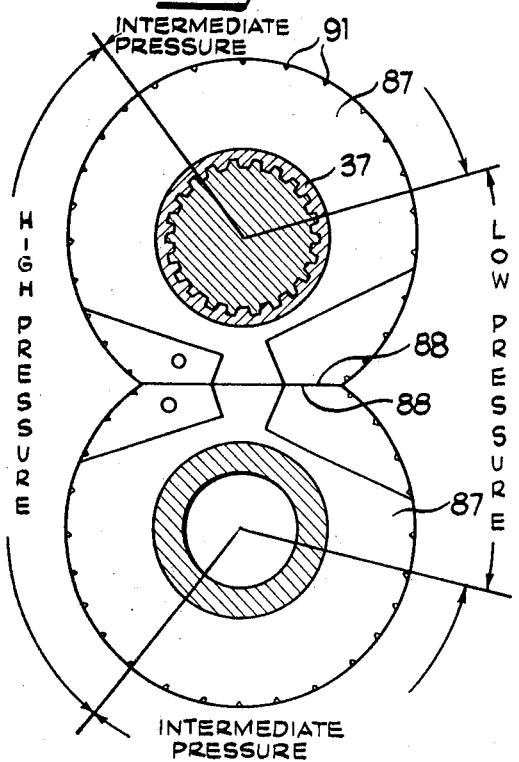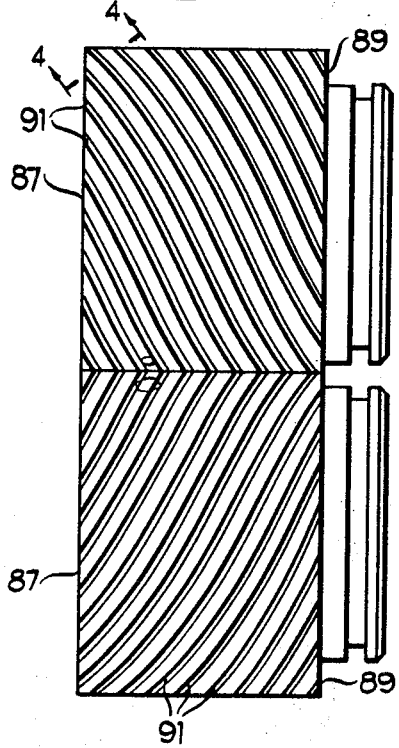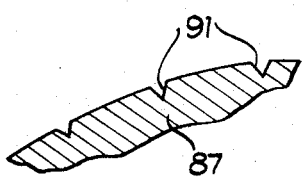

PRESSURE LOADED PUMP

BACKGROUND OF THE INVENTION

This invention relates to a pressure loaded pump. MOre particularly, it relates to a pressure loaded pump including axially movable pressure loadable bushings adapted to insure freedom of axial mobility, even under adverse operating condition.

As is well known, a pressure loaded gear pump generally includes one set of essentially stationary bushings and one set of axially movable pressure loadable bushings. A portion of the output pressure of the pump is applied to the rear or motive surfaces of the axially movable bushing to urge those bushings into sealing engagement with the associated side surfaces of the pumping gears and further urges the opposite side faces of the gears into sealing engagement with the static or stationary bushings. Since the pressure loadable bushings must be movable, a certain minimum clearance must be provided between the outer peripheral surfaces of the bushings and the adjacent surfaces or bores of the pump housing in which the bushings are received.

Contaminates, such as dirt, metal, oxides and the like, are present in a great majority of the liquids pumped by gear type pumps. These contaminants are a particular problem in pumping of liquid fuel for aircraft. The contaminants not only cause premature wear of the gear and bearing faces and gear journals; they, in addition, create a serious problem in relation to the essential axial mobility of the pressure loadable bushings.

Gear type pressure loadable pumps suffer significant performance depreciation when the axially movable bushings are unable to shift axially in response to the application of pressurized fluid into the pressure loading chambers to maintain a sealing relation between the bushing side faces and the mating gear faces. Freedom of axial movement of the pressure loadable bushings, therefore, must be maintained to insure satisfactory output efficiency.

Elimination of the problem of sticking of the axially movable bushings within the housing bores cannot be eliminated simply by increasing the tolerance or clearance between the outer peripheral surface of the bearing bushings and the housing bores. Such a condition would provide a leakage path of sufficient magnitude between the output side of the pump and inlet pressure to create an unbearable loss of pump efficiency. For that reason, attempts to eliminate the problem of sticking of the pressure loadable bushings by enlarging the peripheral clearances have proven to be unsuccessful.

Attempts have been made to utilize O-ring seals and other sealing configurations to prevent entrance of contaminants between the outer peripheral surfaces of the bushings and the housing bores. These arrangements have proven to be extremely complicated and unreliable.

It is, therefore, the primary object of the present invention to provide an improved arrangement for a pressure loaded pump including axially movable pressure loadable bushings wherein freedom of axial mobility is insured, even under the most adverse conditions of contamination.

SUMMARY OF THE INVENTION

Very generally, the pressure loaded gear pump of the present invention includes a pair of axially movable pressure loadable bushings, which are urged axially against the pumping gears by outlet pressure directed to pressure loading chambers disposed behind the bushings. The bushings are supported for axial movement within bores formed in the pump housing. The outer peripheral surfaces of the bushings include a series of helical serrations or grooves which provide a path for pumped fluid. These grooves preclude the possibility of sticking of the outer peripheral surface of the bushings within the housing bores and insure axial mobility of the bushings even under adverse contamination conditions.

The serrations or grooves are formed upon an axial pitch such that the serrations open at the high-pressure areas of the pump, extend helically about the outer peripheral surface, and open into the pressure loading area of the pump. The serrations or grooves open to the lower pressure gradient areas extend about the outer peripheral surface, and communicate with corresponding grooves formed in the other bushing at the bushing flats. This arrangement precludes the possibility of loss of pump performance due to fluid flow from the discharge portion of the pump to inlet pressure zones.

DESCRIPTION OF THE DRAWINGS

FIG. 1 is a sectional elevational view of a pressure loadable pump which is illustrative of the principles of the present invention.

FIG. 2 is an elevational view of a portion of the apparatus of FIG. 1 illustrating the bearing face areas of the axially movable bushings taken generally along the line 2-2 of FIG. 1.

FIG. 3 is a side elevational view of a portion of the apparatus of FIG. 1 illustrating the outer peripheral surfaces of the axially movable, pressure loadable bushings.

FIG. 4 is a fragmentary sectional view on an enlarged scale of one of the axially movable, pressure loadable bushings illustrated in FIG. 3, taken generally along the line 4-4 of that figure.

DETAILED DESCRIPTION

Turning now to the drawings, there is shown an embodiment of a pressure loaded pump illustrative of the principles of the present invention.

The pump, generally designated 11, includes a main body portion 13 and a closure member 15. These sections are secured together to form a pump cavity defined by surfaces 19 and 20, forming a pair of parallel bores or pumping gear chambers. Appropriate inlet and discharge ports are provided in the body portion 13 which communicates with the pumping gear chambers.

A pair of intermeshing gears 31 and 33 are disposed in the pump cavity within the pumping gear chambers defined by the surfaces 19 and 20. The gears include parallel side faces 34 extending perpendicularly of the axis of rotation of the gears.

The gears further include integrally formed hollow journals 35 and 37 extending axially outwardly from the gear side faces 34 which rotatably support the gears within the pump. One gear 31 includes an internal spline formed within the journal to receive a drive shaft 39. The drive shaft extends outwardly of the pump housing through the closure member 15 for connection to a source of external power (not shown). A seal 41 is provided between the drive shaft 39 and the closure member 15 to provide a fluid tight seal. Rotation of the drive shaft causes rotation of the intermeshed gears and consequent pumping of fluid between the inlet and discharge ports.

The pumping gears 31 and 33 are operatively supported within the pump 11 by bearing bushings 43 and 45 disposed on opposite sides of each pumping gear in surrounding relation to the journals 35 and 37.

The bearing bushings 43 and 45 associated with one of the gears 31 and 33 are essentially identical to the bearing bushings associated with the other. Therefore, it should be understood that the description of one set of bushings is equally applicable to the other.

Referring to FIG. 1, the bearing bushings 43 associated with the journals 35 are essentially stationary and include outer peripheral surfaces 47 which are fit into intimate relation with the surfaces 19 and 20 defining the pumping gear chamber. Each bushing includes a flat 48 disposed in face-to-face contact with the associated flat of the other bushing.

The bushings 43 include journal bearing surfaces 49 which rotatably support the journals 35 of the pumping gears. Additionally, each bushing includes an essentially planar sealing face 53 disposed in sealing contact with the associated pumping gear side face 34.

The bearing bushings 45 are axially movable pressure loadable bearing bushings. These bushings include outer peripheral surfaces 73 which are sized to provide a slight clearance between the peripheral surfaces of the bushings and the surfaces 19 and 20 of the pumping cavity. In this way, the bearing bushings are free to move axially within the defining bores. Each bushing includes a flat 88, shown in FIGS. 2 and 3, which is disposed in face-to-face contact with the flat of the adjacent bushing.

The bushings 45 further include journal bearing surfaces 74 which rotatably support the gear journals 37. Additionally, the axially movable pressure loadable bushings include essentially planar sealing faces 87, as seen in FIG. 2, which are disposed in sealing contact with the associated pumping gear side faces 34.

The axially movable pressure loadable bushings 45 include rear or motive surfaces 89 which define with the main body portion 13, pressure loading chambers 90, which are in communication with pumped fluid at essentially discharge pressure. The pumped fluid, under pressure, is directed to the pressure loading chambers to urge the axially movable bushings 45 axially toward the gears 31 and 33. The gears are, in turn, urged axially toward the essentially stationary bushings 43. In this manner, the planar sealing faces 87, of the axially movable bushings, and the planar sealing faces 53, of the stationary bushings are urged into sealing relation with the gear side faces. In this manner, an efficient contained pumping chamber is defined by the bushing side faces, minimizing leakage between the side faces of the bushings and gears, and maintaining maximum pumping efficiency.

In accordance with the present invention, and as best illustrated in FIGS. 3 and 4, the outer peripheral surfaces 73 of the axially movable, pressure loadable bushings 45 are provided with a series of serrations or grooves 91, which extend in a helical pattern about the peripheral surfaces. The helical pattern on one bushing extends in a clockwise direction and the helical pattern on the other bushing extends in a counterclockwise pattern providing a herringbone pattern as illustrated in FIG. 3.

As illustrated in FIG. 2, the grooves 91 are open at the bushing sealing faces 87 and, therefore, communicate with fluid under pressure within the pumping chamber. This fluid is free to enter the helical grooves for distribution between the outer peripheral surfaces of the movable bushings and the cavity defining surfaces 19 and 20.

The axial pitch of the helical grooves 91 is such that the grooves open at the high-pressure zones of the pump bushing sealing faces 87, extend about the outer peripheral surfaces, and into the pressure loading chambers 90. In this way, both ends of the grooves are exposed to essentially discharge pressure.

The serrations or grooves 91 open at the planar sealing faces 87 to intermediate or low pressures existing about the sealing faces, extend about the periphery of the bushings and terminate at the flats 88. At that point, they communicate with the corresponding grooves 91 formed in the other of the movable bushings. By virtue of the helical pitch provided, the grooves 91 open to intermediate or low-pressure zones (see FIG. 2) at the sealing face 87 of one of the bushings 45 communicate with grooves open to zones of similar pressure at the sealing face 87 of the other movable bushing.

The grooves 91 open to the zones of high pressure at the sealing faces 87 communicate with the pressure loading chamber. The grooves 91 open to intermediate or low pressure at the sealing faces 87 communicate with grooves open to similar pressure zones at the sealing face of the other bearing. Thus, there is essentially no flow through the grooves 91 and, consequently, no loss of volumetric efficiency.

As is well known in the art, the internal pressures experienced in a gear pump are pulsating. Consequently, instantaneous pressure differentials are established along the grooves 91 resulting in pulsating or alternate direction flow of the grooves. This precludes the possibility of lodging of contaminants within the clearance between the surfaces 19 and 20 and the bushing peripheral surfaces 73. This arrangement insures freedom of bearing bushing mobility even under extreme conditions of fluid contamination.

Various features of the invention have been particularly shown and described, however, it must be appreciated that various modifications may be made without departing from the scope of the invention. In particular, the principles of the present invention have been illustrated in connection with an embodiment taking the form of a hydraulic pump. However, it is obvious that the apparatus may be reversed and utilized as a hydraulic motor without in any way departing from the spirit and scope of the invention.

What I claim is:

1. A pressure loaded pump comprising a main body portion including a pair of surfaces defining a pumping cavity; a pair of intermeshed pumping gears disposed within said cavity including parallel side faces and supporting journals extending outwardly of said side faces; a pair of bearing bushings supporting each said gear, each of said bushings including a journal bearing bore receiving one of said journals and a generally planar side sealing face in essentially sealing contact with one of said gear side faces; one bushing of each said pair being supported within one of said cavity defining surfaces and being essentially stationary, the other thereof being an axially movable pressure loadable bushing supported by one of said main body portion surfaces for axial movement with respect thereto; each such axially movable bushing including a rear motive surface and defining with said main body portion a pressure loading chamber to receive pumped fluid at essentially discharge pressure to urge said movable bushing toward said stationary bushing to maintain said sealing relation between said planar sealing faces and said gear side faces; each said axially movable pressure loadable bushing including an outer peripheral surface sized to allow axial movement with respect to the supporting surface and including means defining a plurality of grooves extending in a helical pattern about said outer peripheral surface; said grooves being open at said bushing side faces; certain of said grooves being open at said pressure loading chambers defined by said bushings and said main body portion.

2. A pressure loaded pump as claimed in claim 1 wherein said grooves formed in said axially movable pressure loadable bushings and open at said pressure loading chambers open at said bushing side faces in zones of essentially discharge pressure.

3. A pressure loaded pump as claimed in claim 2 wherein said helical pattern of said grooves formed in said axially movable pressure loadable bushings are formed upon axially directed pitch with the pattern formed on one of said bushings extending clockwise and the pattern formed on the other of said bushings extending counterclockwise.

4. A pressure loaded pump comprising a main body portion including a pair of surfaces defining a pumping cavity; a pair of intermeshed pumping gears disposed within said cavity including parallel side faces and supporting journals extending outwardly of said side faces; a pair of bearing bushings supporting each said gear, each of said bushings including a journal bearing bore receiving one of said journals and a generally planar side sealing face in essentially sealing contact with one of said gear side faces; one bushing of each said pair being supported within one of said cavity defining surfaces and being essentially stationary, the other thereof being an axially movable pressure loadable bushing supported by one of said main body portion surfaces for axial movement with respect thereto; each such axially movable bushing including a rear motive surface and defining with said main body portion a pressure loading chamber to receive pumped fluid at essentially discharge pressure to urge said movable bushing toward said stationary bushing to maintain said sealing relation between said planar sealing faces and said gear side faces; each said axially movable pressure loadable bushing including an outer peripheral surface sized to allow axial movement with respect to the supporting surface and including means defining a plurality of grooves extending in a helical pattern about said outer peripheral surface; said grooves being open at said bushing side faces; each said axially movable pressure loadable bushing includes a flat formed in said outer peripheral surface thereof; said bushings being disposed in said main body portion with said flats in mating face-to-face relation, and certain of said grooves formed in said outer peripheral surface of one of said bushings and open at said bushing side face communicate with mating grooves in the other of said bushings at said flats.

5. A pressure loaded pump as claimed in claim 4 wherein said grooves formed in said outer peripheral surface of one of said bushings and communicating with mating grooves formed in the other of said bushings at said flats, open at said bushing side faces in zones of intermediate and low pressure.